US011645729B1

United States Patent
Kocher

(10) Patent No.: US 11,645,729 B1
(45) Date of Patent: May 9, 2023

(54) ID CARD IDENTIFICATION DEVICE (ICID)

(71) Applicant: Robert William Kocher, McLean, VA (US)

(72) Inventor: Robert William Kocher, McLean, VA (US)

(*) Notice: Subject to any disclaimer, the term of this patent is extended or adjusted under 35 U.S.C. 154(b) by 0 days.

(21) Appl. No.: 17/019,474

(22) Filed: Sep. 14, 2020

Related U.S. Application Data

(60) Provisional application No. 62/973,652, filed on Oct. 18, 2019.

(51) Int. Cl.
| | | |
|---|---|---|
| *G06Q 50/26* | (2012.01) | |
| *G06Q 10/10* | (2023.01) | |
| *G07C 9/00* | (2020.01) | |
| *G06K 7/10* | (2006.01) | |
| *G06F 18/22* | (2023.01) | |

(52) U.S. Cl.
CPC .......... *G06Q 50/265* (2013.01); *G06Q 10/10* (2013.01); *G07C 9/00563* (2013.01); *G07C 9/00658* (2013.01); *G06F 18/22* (2023.01); *G06K 2007/10504* (2013.01)

(58) Field of Classification Search
None
See application file for complete search history.

(56) References Cited

U.S. PATENT DOCUMENTS

| | | | | |
|---|---|---|---|---|
| 10,997,809 B2 * | 5/2021 | Petkov | ................ | G07C 9/00563 |
| 11,348,375 B2 * | 5/2022 | Rowe | ...................... | G06F 21/32 |
| 2002/0100803 A1 * | 8/2002 | Sehr | ...................... | G07F 7/1008 |
| | | | | 235/384 |
| 2002/0145050 A1 * | 10/2002 | Jayaratne | ......... | G06Q 20/40145 |
| | | | | 235/492 |
| 2004/0109588 A1 * | 6/2004 | Houvener | .............. | G07C 9/257 |
| | | | | 382/116 |
| 2012/0274775 A1 * | 11/2012 | Reiffel | .................... | G06Q 30/08 |
| | | | | 348/158 |
| 2012/0293642 A1 * | 11/2012 | Berini | ................ | G06K 9/00154 |
| | | | | 348/77 |
| 2013/0215275 A1 * | 8/2013 | Berini | ..................... | G06F 21/34 |
| | | | | 348/150 |
| 2014/0378810 A1 * | 12/2014 | Davis | ..................... | G16H 50/70 |
| | | | | 600/407 |
| 2017/0289341 A1 * | 10/2017 | Rodriguez | .............. | G10L 15/22 |

(Continued)

FOREIGN PATENT DOCUMENTS

FR   WO2017202755   * 11/2017

*Primary Examiner* — Nancy Bitar

(57) ABSTRACT

A system for an ID card identification prevents unauthorized entry to a venue by comparing ID card data for validity and internal matching of a person to a photo on an ID card. The system includes an identification card offered by an individual seeking entry; wherein the identification card includes a photograph of the individual the card is assigned to. An electronic device having a camera thereon takes a photograph of the photograph on the identification card. The electronic device takes a picture of individual offering the identification card for access to the venue. The electronic device verifies the authenticity of the identification card. The electronic device having circuitry and software which determines a match, low match or no match between the individual in the photograph on the identification card and the photograph of the individual presenting the identification card, for entry into the venue.

4 Claims, 5 Drawing Sheets

(56) References Cited

U.S. PATENT DOCUMENTS

| | | | |
|---|---|---|---|
| 2018/0285541 A1* | 10/2018 | Drolshagen | H04L 9/3231 |
| 2019/0026606 A1* | 1/2019 | Hong | G06K 9/6262 |
| 2019/0199718 A1* | 6/2019 | Nigam | H04L 9/3231 |
| 2019/0213311 A1* | 7/2019 | Tussy | G06F 21/32 |
| 2019/0213816 A1* | 7/2019 | Grigorov | H04N 7/181 |
| 2019/0272695 A1* | 9/2019 | Schwartz | G07C 11/00 |
| 2020/0042685 A1* | 2/2020 | Tussy | G06F 21/32 |

* cited by examiner

ID CARD IDENTIFICATION DEVICE (ICID)

CROSS-REFERENCE TO RELATED APPLICATIONS

This application claims priority from US Provisional Patent Application No. 62/973,652, filed on Oct. 18, 2019, titled ID Card Identification Device (ICID), the contents of which are incorporated herein by reference, in its entirety.

FEDERALLY SPONSORED RESEARCH

None

BACKGROUND

Field of the Invention

The invention relates to the general field of being able to verify the authenticity of an Identification Card (ID card) using a verification of the ID card by matching an individual to the photo on the ID Card, for identification purposes.

Description of the Related Art

In the related art, it is common for an individual trying to gain access to a venue, such as a military base, by showing their ID card to the guard at the entrance to the venue. In theory, the guard is supposed to carefully look at both the individual presenting the ID Card and at the ID Card itself, in order to determine whether the individual matches the photograph on the ID card and should be allowed to enter the venue. The first major problem with the related art is the small photo size on the ID card. It is very difficult to attempt to match a person's face against a small, approximately 2-inch photograph, with the face even smaller in the photo. The second problem is the photo's age. Many of the retried personnel with a military ID card may have an expiration date of 10 to 20 years after issuance of the ID card. Numerous security access tests have shown that presenting an ID card to a Guard is a very easy way to beat the system if the card is fake or if the individual is using another person's card or a fake card. The Guard has approx. 2-5 seconds to verity the validity of the card, expiration date, holistically look at the photo and compare to the person in the car or standing in front him/her. The Guard is required to check 100's of ID cards per day, which leads to a mind-numbing repetitive task.

Privacy is also a major concern when taking someone's photo and comparing the photo to large databases. Current systems are designed to capture a person's picture and forward the picture to a large database for comparison, and the photo is then retained for many times of future use.

The result is that the guard may not, due to human frailties, carefully check the photograph on the ID card with the face of the person displaying the ID Card, resulting in an individual gaining access even though access by the individual should be denied. Thus, there exists a need to develop a system to assist the guard with the decision-making process, by using a system and method that recommends whether or not the individual displaying the ID Card should be allowed entry to the venue or that the guard should request another form of ID.

The use of a system determination of who can enter the facility, rather than a decision made by the guard, will substantially lessen the situation of occurrence of individuals being allowed to enter the venue, even though they are not eligible to enter.

SUMMARY OF EXEMPLARY EMBODIMENTS OF THE INVENTION

To overcome the problems associated with the current state of the art, and to provide enhanced security at military bases and other venues, a system and method are provided which assists the guard's decision-making by determining whether the ID is valid and whether the individual's face matches the photo on the ID Card.

The system includes a handheld device which takes a photograph of the ID Card being presented. Software in the device taking the photograph of the ID card being offered for entry, determines whether or not the ID Card being presented is in fact authentic, and whether the ID card being offered is or not a copy or replica or forgery of an ID card.

The system, in the next step takes a photograph of the individual offering the card to gain access. The device which takes the photographs of both the ID Card and the individual converts the photograph of the individual to a template and makes a determination of whether there is in fact a match between the offered ID Card and the photograph of the individual, and emits a green light if there is a high probability of a match. If the probability of the face match is low, a yellow light will be displayed, and the guard will then request further identification. If further identification is provided and the guard is confident that there is a match, the guard will proceed to allow the individual to enter the base or venue, etc.

If the guard is unsure as to whether or not there is a match, the guard will call a supervisor who will review the information provided and will check a watch list to ascertain whether the person is on a watch list for arrest or otherwise not permitted to enter the base or venue. If needed, the supervisor will contact security to apprehend the individual. If the system indicates a red light which indicates no match between the photograph on the ID card and the photograph of the individual seeking access, or the individual does not provide alternate identification, the supervisor will check the watch list, and if the identity of the individual cannot be confirmed, the individual will be denied entry, even if the individual is not on a watch list. According to an exemplary embodiment, a system for an ID card identification, the system prevents unauthorized entry to a venue. The system requires an identification card offered by an individual seeking entry to the venue, wherein the identification card includes a photograph of the individual that the card is assigned to. An electronic device having a camera thereon takes a photograph of the individual on the identification card. The electronic device takes a picture of the individual offering the identification card for access to the venue. The electronic device has circuitry and software which verifies the authenticity of the photograph on the identification card. The electronic device having circuitry and software which determines a match, low match or no match between the individual in the photograph on the identification card and the photograph of the individual presenting the identification card, for entry into the venue.

With respect to privacy, all checks can be done at the point where the guard is stationed, and the photograph of the individual is not retained. The device can use the face photo taken from the card and compare the photo on the card to the to the live scan photo taken of the person.

LIST OF REFERENCE NUMERALS FOUND IN THE DRAWINGS

Element 10 represents Step 1 of the method.
Element 100 represents the ID card being presented as identification.
Element 110 represents the photograph on the ID card.
Element 120 represents the electronic camera device taking a photograph of the image on the ID card.
Element 130 represents the button pushed on the camera device 110 to photograph the ID card 100.
Element 140 represents the camera.
Element 20 represents Step 2 of the method.
Element 200 represents the individual whose picture is being taken.
Element 30 represents Step 3 of the method.
Element 150 represents no match.
Element 160 represents a red light being displayed.
Element 170 represents a low match.
Element 180 represents a yellow light being displayed.
Element 190 indicates questionable authenticity of ID card, such as a red light.
Element 220 represents a green light being displayed.
Element 400 represents the guard asking the individual for further identification.
Element 420 represents a guard contacting a supervisor using a mobile phone.
Element 500 represents the guard's supervisor.
Element 520 represents the supervisor's mobile phone.
Element 600 represents a workstation.
Element 620 represents a screen on which the supervisor is viewing a watch list.
Element 630 represents the keyboard on the workstation.

DETAILED DESCRIPTION OF EXEMPLARY EMBODIMENTS OF THE INVENTION

The figures and alternate embodiments of the System and Method for an ID Card Identification Device are discussed below.

Figure 1:
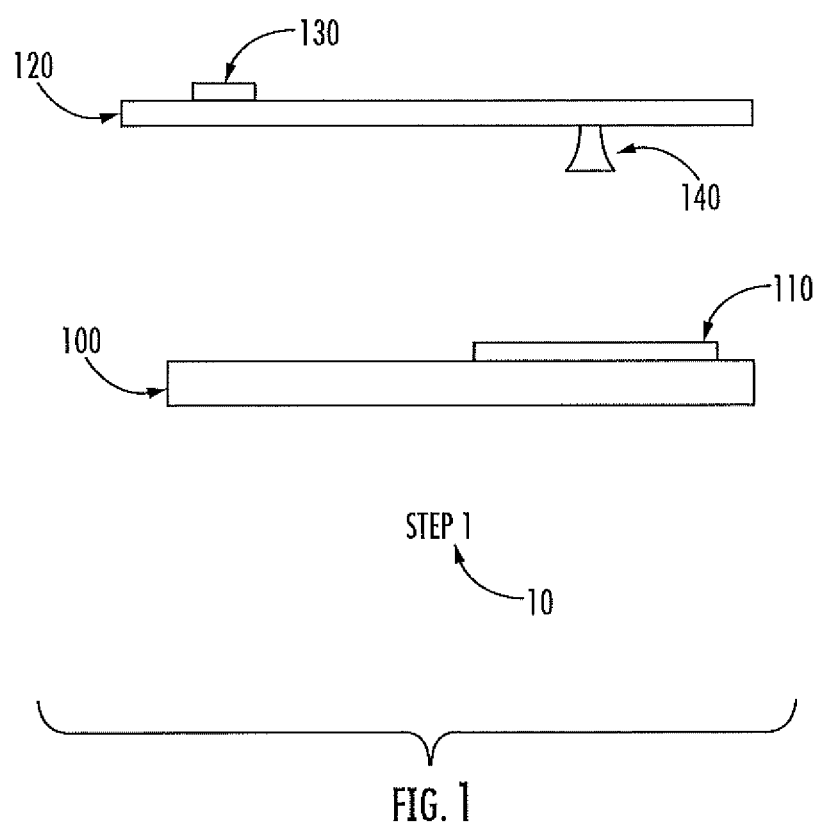
FIG. 1 is a representation of photographing the presented ID card.

Beginning with FIG. 1, the Figure includes an ID card 100 having a photograph 110 of the individual presenting the ID card for identification and access to a military base or other venue. Also illustrated in FIG. 1 is an electronic device 120 which includes a push button 130 that is pushed to take a photograph of the photograph 110 in the Identification card 100 being presented for identification and access to the venue. The system includes the handheld device 120 which takes a photograph of the photograph of the photograph 110 on the Identification card 100. Software in the electronic device 120 taking the photograph of the photograph on the ID Card being presented for entry, determines firstly whether or not the ID card being offered is in fact authentic, and is not a copy, replica or forgery of an actual ID card. The software will present its determination as to the authenticity of the ID card and will display a green light 190 or yellow light 170 if likelihood of a match is low, or a red light 150 if no match between the photograph on the ID card and the photograph of the individual seeking access exists, or red light 190 of the results on FIG. 3. FIG. 1 represents Step 1, illustrated as 10, of the method, which is to take a photograph of the photograph 110 on the presented ID Card and to verify that the ID card 100 and the photograph 110 are in fact authentic.

Figure 2:
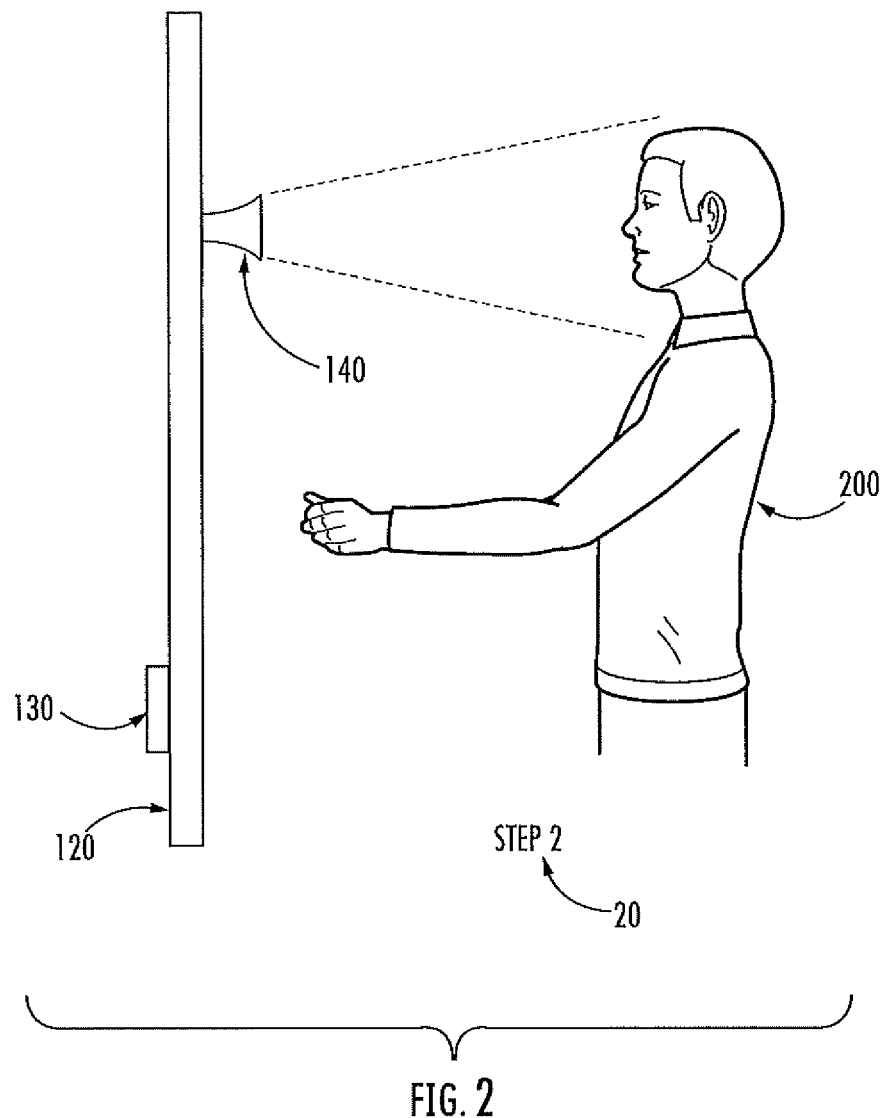
FIG. 2 represents photographing the individual presenting the ID card for entry.
Figure 3:
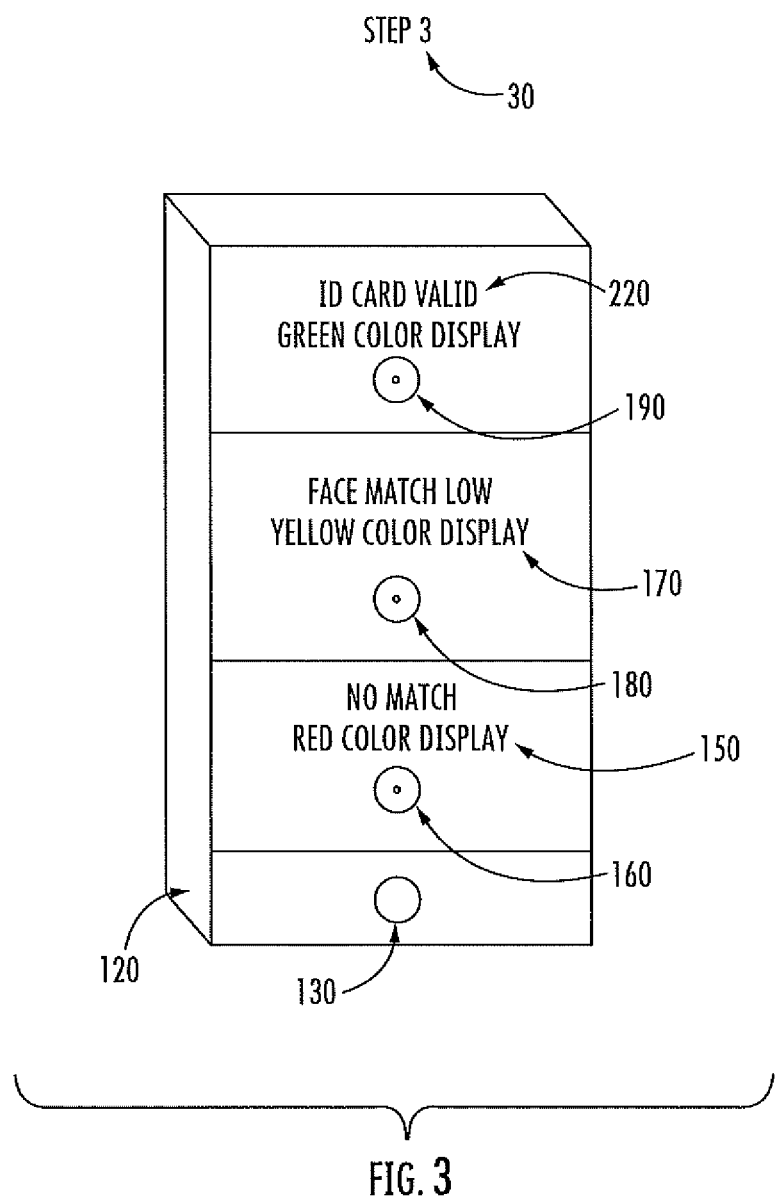
FIG. 3 is a representation of the rear of the device which is taking the photographs of the ID card and the individual.
Figure 4:
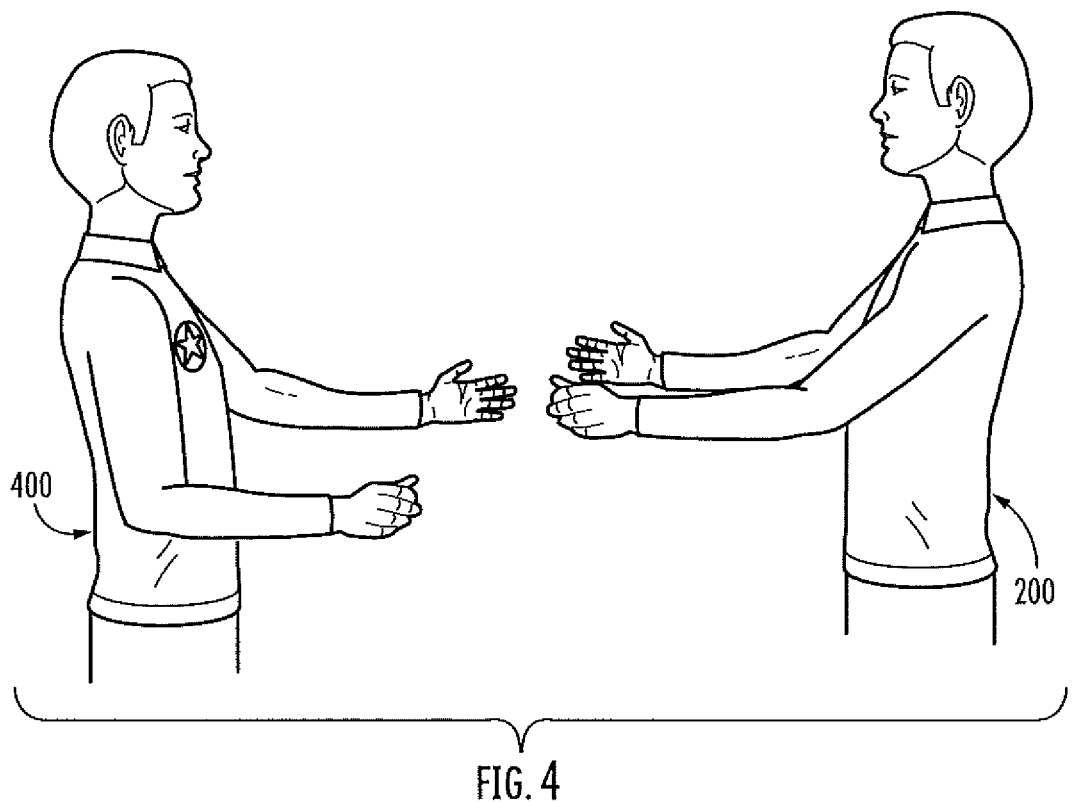
FIG. 4 is a representation of the guard asking for further identification from the individual.

Turning to FIG. 2, this figure represents the electronic device 120 taking a picture of the individual seeking access to the military base or other venue, using camera 140. FIG. 2 represents Step 2, illustrated as 20, of the method of the ID card Identification Device (ICID). The electronic device 120 includes electronics for determining whether there is a match, low likelihood of a match or no match, as discussed in FIG. 3, infra. The system in Step 2 takes a photograph of the individual offering the card to gain access. If the system indicates a red light, indicating no match, or the system indicates a yellow light which represents a low likelihood of a match and the individual does not provide alternate identification, the supervisor 500 will check the watch list and if the identity of the individual cannot be confirmed, the individual will be denied entry.

as shown in FIG. 3, which is Step 3, illustrated as 30, of the method of carrying out the invention, the electronic device 120, which takes the photographs of both the ID card 100 and the individual 200 presenting the ID Card 100, converts the photograph 110 of the individual to a template and makes a determination of whether there is in fact a match between the offered ID card and the photograph of the individual. The system emits a green light 190 if there is a high probability of a match. If the probability of the face match is low, as indicated at 170, a yellow light 180 is displayed and the guard 400 will then request further identification, as shown in FIG. 4. If further identification is provided and the guard 400 is confident that there is a match, the guard will proceed to allow the individual to enter the military base or venue, etc.

Figure 5:
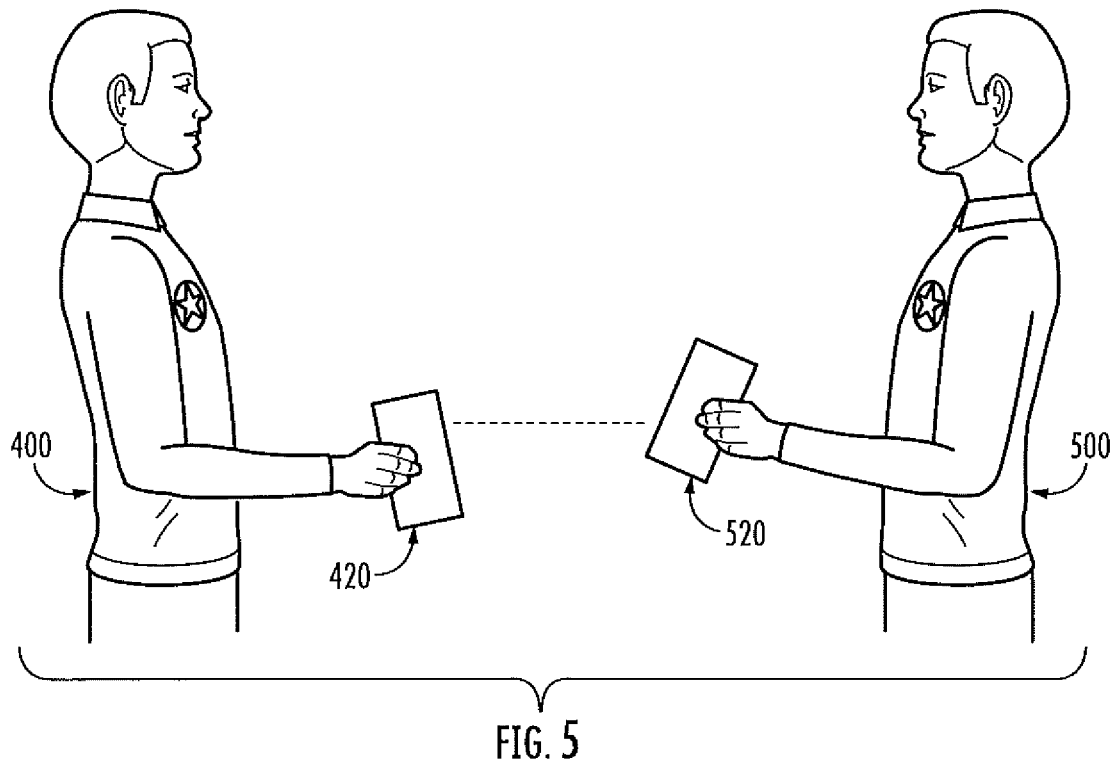
FIG. 5 is a representation of the guard contacting the supervisor due to a low face match or no face match.

As illustrated in FIG. 5, if the guard 400 is unsure as to whether a match is established, the guard 400 will contact a supervisor 500 using a mobile phone 420. The supervisor 500 will receive the information on the supervisor's mobile phone 520 and will review the information provided.

Figure 6:
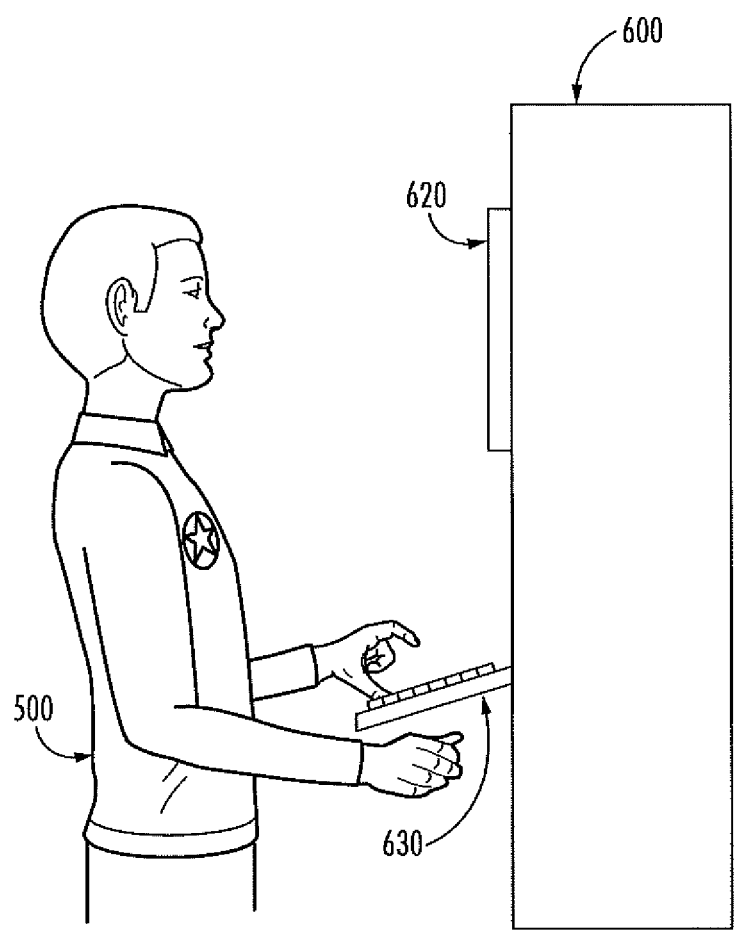
FIG. 6 is representation of the supervisor at a workstation and viewing a watch list.

As shown in FIG. 6, the supervisor 500 will then check a watch list on a computer screen 620 of a workstation 600, using a keyboard 630 to ascertain whether or not the person is on a watch list for arrest or otherwise not permitted to enter the military base or venue. If needed, the supervisor 500 will contact security to apprehend the individual.

From all of the above, it is clear to an artisan that the determination of a match, low match or no match identification by photographing both the ID card 110 and the individual 200 offering the ID card is done by the system and method having the ability to verify the authenticity of the ID card, as well as the match of the individual seeking entry into the military base or venue.

Although exemplary embodiments have been shown and described, other variations of the system would be readily evident to those of ordinary skill in the art. The invention is not limited to the exemplary embodiments described, but rather by the scope of the appended claims.

What is claimed is:

1. A system for an ID card identification device, the system preventing unauthorized entry to a facility or other venue, the system comprising:
   an identification card presented by an individual seeking entry to the facility, or other venue;
   the identification card including a photograph of the individual the card is assigned to:
   an electronic device having a camera thereon; the electronic device being operated by a guard; the electronic device taking a photograph of the photograph on the presented identification card;
   the guard with the electronic device capturing the live scan photo of the individual presenting the identification card for access to the facility or other venue;
   the electronic device having circuitry and software which verifies the authenticity of the identification card offered by the individual for access to the facility or other venue;
   the electronic device having circuitry and software which determines a match, low match or no match between the individual in the photograph on the identification card and the live scan photo of the individual offering the identification card, for entry into the facility or other venue; there is no database to retain the photograph taken by the guard; and no verification of the photographs taken by the electronic device against an authorized database is provided;
   the live scan photo of the individual seeking access, taken by the guard, is not retained.

2. A method of providing an ID card identification verification, the method comprising:
   an individual attempting to obtain entry to a facility or other venue presents an identification card; wherein the identification card includes a photograph of the individual to whom the card is assigned to:
   a guard at an entrance of the facility or other venue having an electronic device including a camera, circuitry and software for photographing the photograph of the individual presenting the ID card for access to the facility or other venue;
   the software of the electronic device determining whether the identification card is authentic;
   upon determining that the ID card is authentic, the guard uses the electronic device to capture the live scan photo of the individual seeking access to the facility or other venue;
   the live scan photo taken of the individual seeking access is then converted into a template to determine whether the photograph of the individual seeking access is authentic;
   the determination of the processing of the live scan photo of the individual seeking entry is one of green light representing a valid match, or a yellow light low match where further review is needed, or a red light no match where further review is needed; there is no database to retain the photograph taken by the guard; and
   no verification of the photographs taken by the electronic device against an authorized database is provided and
   the live scan photo of the individual seeking access, taken by the camera, is not retained.

3. A system for an ID card identification device, the system preventing unauthorized entry to a facility or other venue, the system comprising:
   an identification card presented by an individual seeking entry to the facility or other venue;
   the identification card including a photograph of the individual the card is assigned to:
   an electronic device having a camera thereon; the electronic device having a camera being operated by a guard, the electronic device taking a photograph of the photograph on the identification card;
   the electronic device, operated by the guard, taking a live scan photo of the individual presenting the identification card for access to the facility or other venue;
   the electronic device having circuitry and software which verifies the authenticity of the identification card offered by the individual for access to the facility or other venue;
   the electronic device and if needed, the guard and the supervisor, determine whether to allow entry of the individual into the facility or other venue; there is no database to retain the photograph taken by the guard; and
   no verification of the photographs taken by the electronic device against an authorized database is provided and
   the live scan photo of the individual seeking access, taken by the guard, is not retained.

4. A system for an ID card identification device, the system preventing unauthorized entry to a facility or other venue, the system consisting of;
   an identification card presented by an individual seeking entry to the facility or other venue;
   the identification card including a photograph of the individual the card is assigned to;
   an electronic device having a camera thereon; the electronic device being operated by a guard; the electronic device taking a photograph of the photograph on the presented identification card;
   the guard with the electronic device capturing the live scan photo of the individual presenting the identification card for access to the facility or other venue;
   the electronic device having circuitry and software which verifies the authenticity of the identification card offered by the individual for access to the facility or other venue;
   the electronic device having circuitry and software which determines a match, low match or no match between the individual in the photograph on the identification card and the live scan photo of the individual offering the identification card, for entry into the facility or other venue;
   the live scan photo of the individual seeking access, taken by the guard, is not retained and wherein upon a determination of a high probability of a match a green light will flash, and the guard will permit the individual to enter the venue;
   upon a determination of a low probability of a match, a yellow light will flash and the guard will request additional identification from the individual seeking access to the facility or other venue;
   wherein upon review of the watch list the supervisor will make a decision as to whether or not to permit access to the individual;
   wherein upon a determination of no match by the electronic device after processing the photograph of the individual seeking entry, the supervisor will review the watch list; there is no database to retain the photograph taken by the guard; and
   no verification of the photographs taken by the electronic device against an authorized database is provided and upon a determination of the watchlist that the individual is a subject to arrest, the supervisor will contact security to apprehend the individual when necessary.

* * * * *